United States Patent Office 2,866,804
Patented Dec. 30, 1958

2,866,804

UNSATURATED ESTERS OF HYDROXY ISOTHIOCYANATES

Günther Nischk, Leverkusen, and Hans Holtschmidt, Koln-Stammheim, Germany, assignors to Farbenfabriken Bayer Aktiengesellschaft, Leverkusen, Germany, a corporation of Germany No Drawing. Application December 28, 1955
Serial No. 555,743

Claims priority, application Germany December 30, 1954

6 Claims. (Cl. 260—454)

This invention relates to unsaturated esters of hydroxy isothiocyanates and to a method of preparing the same.

It is known to produce unsaturated isothiocyanates by reacting thiophosgene with unsaturated amines, by decomposing unsaturated thioureas with strong acids or by splitting hydrogen halide from halogen isothiocyanates by means of tertiary amines. It is also known to produce allyl hydroxy isothiocyanates, for example by reaction of allyl hydroxyphenyl amines with thiophosgene.

An interesting group of unsaturated isothiocyanates, however, has not yet been described in the literature. This group consists of the esters from unsaturated acids and hydroxy isothiocyanates, which, owing to their constitution, should be highly reactive and suitable for use in a great many syntheses.

It is an object of the present invention to provide a process for preparing unsaturated esters of hydroxy isothiocyanates. Another object is to provide a process by which unsaturated esters of hydroxy isothiocyanates can be obtained in satisfactory yields. A further object is to provide a process for producing unsaturated esters of hydroxy isothiocyanates which can easily be carried out. Still further objects will appear hereinafter.

These objects are attained in accordance with the present invention by reacting hydroxy isothiocyanates with functional derivatives of unsaturated carboxylic acids. The unsaturated esters thus obtained have the following general formula:

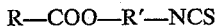

R—COO—R'—NCS in which R represents an unsaturated monovalent radical and R' represents a divalent radical.

The hydroxy isothiocyanates serving as starting materials for the process of the invention are readily obtainable. Thus, p-hydroxyphenyl isothiocyanate can easily be prepared by decomposition of the ammonium salt of p-hydroxyphenyl-dithiocarbamic acid in the presence of phosgene. As it has now been found, aliphatic hydroxy isothiocyanates can be obtained in good yields by reacting hydroxy amines with carbon disulfide and ammonia to form the ammonium salts of the corresponding hydroxy alkyl dithiocarbamic acids, and reacting the latter with ethyl chlorocarbonate. With butanediol amine-1,4 as a illustrative example of an hydroxy amine, this synthesis can be represented by the following equations:

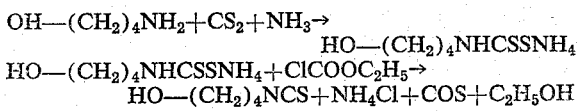

OH—(CH$_2$)$_4$NH$_2$+CS$_2$+NH$_3$→
                            HO—(CH$_2$)$_4$NHCSSNH$_4$
HO—(CH$_2$)$_4$NHCSSNH$_4$+ClCOOC$_2$H$_5$→
    HO—(CH$_2$)$_4$NCS+NH$_4$Cl+COS+C$_2$H$_5$OH

Functional derivatives of unsaturated carboxylic acids which may be used in the practice of the invention include the anhydrides, halides and esters of these acids, representative examples of suitable compounds being acrylic acid chloride, methacrylic acid anhydride, crotonic acid anhydride, linoleic acid anhydride, p-vinyl benzoic acid ester and the like.

In carrying out the present invention, the reactants employed in equivalent or nearly equivalent amounts are brought together in any desired manner. Preferably, the reaction is effected in a diluent, such as inert organic solvents. Depending upon the reactivity of the reactants, the process of the invention is carried out with cooling or heating. Thus, the reaction between p-hydroxyphenyl isothiocyanate and acrylic acid chloride proceeds with a satisfactory velocity in the cold while in many other instances, it is advisable to heat the reactants to an elevated temperature, say to the boiling point of the diluent employed in order to terminate the reaction within a reasonable period.

When using the halides of unsaturated carboxylic acids as reactants, the reaction can be accelerated by means of alkaline substances, such as alkali hydroxides and tertiary amines.

In many cases, particularly when carrying out the reaction at elevated temperature, it is advantageous to employ a polymerization stabilizer in order to prevent polymerization of the unsaturated reaction product. Sulfur, copper, hydroquinone and quinhydrone are representative examples of polymerization stabilizers suitable for use in the process of the invention.

The unsaturated esters of hydroxy isothiocyanates obtainable by the process of the invention are either liquid or solid compounds which are readily soluble in many organic solvents, such as alcohols, ethers and aromatic hydrocarbons. In the presence of the above-mentioned polymerization stabilizers, the novel compounds can be stored indefinitely.

Due to the double bond and the isothiocyanate group contained in their molecule, the new esters are very reactive and capable of undergoing two types of reactions, i. e., polymerization or copolymerization with other unsaturated compounds and addition reactions with compounds containing reactive hydrogen, such as hydroxyl polyesters.

The new unsaturated esters of the invention have many uses. One important application is in the production of plastics where they can be used as polymerization components and cross-linking agents. Another important application is their use as intermediates in organic synthesis, such as in the production of drugs and insecticides.

The invention is further illustrated by the following examples without being restricted thereto.

Example 1

To a solution of 60 parts of p-hydroxyphenyl isothiocyanate in 200 parts of benzene there are added 80 parts of methacrylic acid anhydride and 2 parts of copper powder. The solution is heated for 2 hours under reflux. When the greenish solution has cooled, it is diluted with 200 parts of benzene, poured on to ice and neutralized with sodium bicarbonate while shaking. After separating the aqueous phase the residue is thoroughly dried with calcium chloride, clarified twice with active carbon and concentrated in vacuo after addition of 0.05 part of hydroquinone. On cooling, 80 parts of methacrylic acid-4-isothiocyanate phenyl ester crystallize out. Melting point after drying on clay: 79° C. Mixed with p-hydroxyphenyl isothiocyanate: liquid at room temperature.

Example 2

50 parts of p-hydroxyphenyl isothiocyanate are boiled under reflux for 6 hours in 250 parts of benzene with 65 parts of crotonic acid anhydride. After cooling, the mixture is poured on to ice and neutralized with sodium bicarbonate; it is then shaken several times with water and dried over calcium chloride. After removing the benzene in vacuo, a crystalline mass is obtained which is recrystallized from benzene. Yield: 60 parts of crotonic acid-4-isothiocyanate phenyl ester, M. P. 92° C.

*Example 3*

46 parts of p-hydroxyphenyl isothiocyanate are dissolved in 250 cc. of water with 12 parts of sodium hydroxide. The solution is clarified with a small amount of active carbon and then covered with 100 parts of benzene. 30 parts of acrylic acid chloride are added dropwise while stirring and cooling. The mixture is stirred for 5 minutes at 5° C. and then for 30 minutes at 30° C., care being taken that the solution does not become acid. After separating the benzene, the mixture is dried with calcium chloride, clarified with active carbon and concentrated in vacuo upon addition of 0.03 part of hydroquinone. After cooling, 55 parts of acrylic acid-4-isothiocyanate phenyl ester crystallize out. Melting point: 45° C. after drying. Mixed with hydroxyphenyl isothiocyanate: liquid at room temperature.

*Example 4*

131 parts of 4-hydroxybutyl isothiocyanate are dissolved in 300 parts of benzene and boiled for 5 hours under reflux with 170 parts of crotonic acid anhydride. The mixture is then poured on to ice, neutralized with soda, washed with water and the benzene solution dried with CaCl$_2$. After distilling off the solvent in water jet vacuum, crotonic acid-4-isothiocyanate-butyl ester is obtained as a colorless oil. Yield: 170 parts.

*Example 5*

145 parts of 4-hydroxy-hexahydrophenyl isothiocyanate are dissolved with addition of 6 parts of copper powder in 500 parts of benzene and boiled for 6 hours under reflux with 170 parts of methacrylic acid anhydride. After cooling, the mixture is poured on to ice and neutralized with soda. The benzene solution is separated and dried with CaCl$_2$. After distilling off the benzene in water jet vacuum, 190 parts of methacrylic acid-4-isothiocyanate-hexahydrophenyl ester are obtained.

The above description and examples are intended to be illustrative only. Any modification or variation therefrom whch conforms to the spirit of the invention is intended to be included within the scope of the claims.

What is claimed is:

1. As compounds, unsaturated esters of hydroxy isothiocyanates having the formula

R—COO—R′—NCS in which R represents an unsaturated monovalent radical selected from the group consisting of lower alkenyl and lower alkadienyl radicals and R′ represents a divalent radical selected from the group consisting of lower alkylene, phenylene and cyclohexylene radicals.

2. As a compound, an unsaturated ester of an hydroxy isothiocyanate having the formula

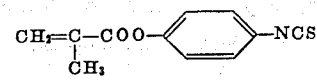

3. As a compound, an unsaturated ester of an hydroxy isothiocyanate having the formula

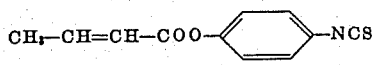

4. As a compound, an unsaturated ester of an hydroxy isothiocyanate having the formula

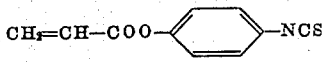

5. As a compound, an unsaturated ester of an hydroxy isothiocyanate having the formula

CH$_3$—CH=CH—COO—(CH$_2$)$_4$—NCS

6. As a compound, an unsaturated ester of an hydroxy isothiocyanate having the formula

References Cited in the file of this patent

UNITED STATES PATENTS

| | | |
|---|---|---|
| 2,073,363 | Carothers et al. | Mar. 9, 1937 |
| 2,500,855 | Nierderl et al. | Mar. 14, 1950 |

UNITED STATES PATENT OFFICE
Certificate of Correction

December 30, 1958

Patent No. 2,866,804

Günther Nischk et al.

It is hereby certified that error appears in the printed specification of the above numbered patent requiring correction and that the said Letters Patent should read as corrected below.

Column 4, below line 35, insert the following formula:

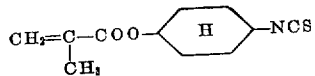

Signed and sealed this 11th day of August 1959.

[SEAL]

Attest:
KARL H. AXLINE,
*Attesting Officer.*

ROBERT C. WATSON,
*Commissioner of Patents.*